United States Patent
Ito et al.

(10) Patent No.: US 11,353,014 B2
(45) Date of Patent: Jun. 7, 2022

(54) RECIPROCATING COMPRESSOR

(71) Applicant: HITACHI AUTOMOTIVE SYSTEMS, LTD., Ibaraki (JP)

(72) Inventors: Tsutomu Ito, Sagamihara (JP); Takafumi Maruta, Fujisawa (JP)

(73) Assignee: HITACHI ASTEMO, LTD., Ibaraki (JP)

(*) Notice: Subject to any disclaimer, the term of this patent is extended or adjusted under 35 U.S.C. 154(b) by 0 days.

(21) Appl. No.: 16/478,981

(22) PCT Filed: Jan. 25, 2018

(86) PCT No.: PCT/JP2018/002272
§ 371 (c)(1),
(2) Date: Jul. 18, 2019

(87) PCT Pub. No.: WO2018/139530
PCT Pub. Date: Aug. 2, 2018

(65) Prior Publication Data
US 2019/0368482 A1    Dec. 5, 2019

(30) Foreign Application Priority Data
Jan. 26, 2017  (JP) .............................. JP2017-012301

(51) Int. Cl.
*F04B 39/08*  (2006.01)
*F04B 35/04*  (2006.01)
(Continued)

(52) U.S. Cl.
CPC .............. *F04B 39/08* (2013.01); *F04B 35/04* (2013.01); *F04B 39/125* (2013.01); *B60G 11/27* (2013.01); *B60G 2500/302* (2013.01)

(58) Field of Classification Search
CPC ...... F04B 53/12; F04B 53/121; F04B 53/123; F04B 53/125; F04B 53/127; F04B 53/128;
(Continued)

(56) References Cited

U.S. PATENT DOCUMENTS 4,716,924 A * 1/1988 Pacht ...................... F04B 49/10
                                                      137/327
4,936,339 A * 6/1990 Bennett ................. F16K 15/025
                                                     137/454.6
(Continued)

FOREIGN PATENT DOCUMENTS

DE    10 2015 101 224    7/2015
JP        2006-266268    10/2006
(Continued)

OTHER PUBLICATIONS

International Search Report dated Apr. 24, 2018 in International (PCT) Application No. PCT/JP2018/002272 with English translation.

(Continued)

*Primary Examiner* — Essama Omgba
*Assistant Examiner* — Christopher J Brunjes
(74) *Attorney, Agent, or Firm* — Wenderoth, Lind & Ponack, L.L.P.

(57) ABSTRACT

A reciprocating compressor includes a cylinder including a cylindrical cylinder portion and a cylinder head portion provided on one side of the cylinder portion, and a piston mechanism reciprocably fittedly inserted on an inner peripheral side of the cylinder portion and including a piston defining a compression chamber and a non-compression chamber. A bottomed hole-shaped valve body housing portion is formed at the cylinder head portion. The valve body housing portion is opened to a piston side facing the piston (Continued)

in an axial direction of the cylinder portion. Further, a discharge valve unit and a valve holding member are provided in the valve body housing portion. The discharge valve unit is inserted in the valve body housing portion. The valve holding member holds the discharge valve unit in the valve body housing portion, and includes a communication hole establishing communication between the valve body housing portion and the compression chamber.

6 Claims, 5 Drawing Sheets

(51) Int. Cl.
*F04B 39/12* (2006.01)
*B60G 11/27* (2006.01)

(58) Field of Classification Search
CPC ...... F04B 53/129; F04B 39/08; F04B 39/121; F04B 39/125; F04B 39/1013; F04B 35/04; F04B 7/02; B60G 11/27; B60G 2500/302; B60G 2204/20; F16K 27/02; F16K 1/32; F16K 1/34
USPC .......................................... 251/325, 333, 366
See application file for complete search history.

(56) References Cited

U.S. PATENT DOCUMENTS

| | | | | |
|---|---|---|---|---|
| 5,241,986 A | * | 9/1993 | Yie | ............................ B24C 5/02 |
| | | | | 137/538 |
| 5,419,365 A | * | 5/1995 | Jezek | .................. F16K 17/0473 |
| | | | | 137/454.6 |
| 8,578,837 B1 | * | 11/2013 | Burhoe | .................... F15B 15/22 |
| | | | | 91/405 |
| 2003/0196712 A1 | * | 10/2003 | Graber | ................ F16K 11/0746 |
| | | | | 137/625.41 |
| 2006/0045770 A1 | | 3/2006 | Chuang | |
| 2006/0196353 A1 | | 9/2006 | Broser et al. | |
| 2009/0175746 A1 | * | 7/2009 | Park | ..................... F04B 39/1066 |
| | | | | 417/520 |
| 2011/0076164 A1 | * | 3/2011 | Chou | ...................... F04B 53/12 |
| | | | | 417/321 |
| 2014/0294636 A1 | * | 10/2014 | Ito | .......................... F04B 53/147 |
| | | | | 417/521 |
| 2015/0078925 A1 | * | 3/2015 | Choi | ..................... F04B 53/008 |
| | | | | 417/228 |
| 2015/0211500 A1 | * | 7/2015 | Kumazawa | ............. F04B 1/182 |
| | | | | 137/471 |

FOREIGN PATENT DOCUMENTS

| | | |
|---|---|---|
| JP | 2014-199023 | 10/2014 |
| JP | 2016-164394 | 9/2016 |

OTHER PUBLICATIONS

Written Opinion of the International Searching Authority dated Apr. 24, 2018 in International (PCT) Application No. PCT/JP2018/002272 with English translation.
Office Action dated Aug. 4, 2021 in German Patent Application No. 11 2018 000 540.2, with English translation.

* cited by examiner

RECIPROCATING COMPRESSOR

TECHNICAL FIELD

The present invention relates to a reciprocating compressor preferably usable to supply and discharge compressed air for adjusting a vehicle height to and from an air suspension mounted on a vehicle, such as a four-wheeled automobile.

BACKGROUND ART

Generally, an air suspension mounted on a vehicle as a vehicle height adjustment apparatus can prevent or reduce a change in a height of a vehicle (a vehicle height) according to, for example, a change in a weight of a load thereon, and also appropriately adjust the vehicle height according to, for example, a preference of a driver. In this case, compressed air is arranged so as to be supplied from and discharged to an in-vehicle air compressing machine (an air compressor) to and from the air suspension.

Then, the in-vehicle air compressor causes a reciprocating compressor to be driven by an electric motor, thereby supplying the compressed air from this reciprocating compressor toward the air suspension.

The reciprocating compressor includes a cylinder and a piston mechanism. The cylinder includes a cylindrical cylinder portion and a cylinder head portion integrally formed on one side of the cylinder portion. The piston mechanism is reciprocably fittedly inserted on an inner peripheral side of the cylinder portion, and includes a piston defining an inside of the cylinder portion into a one-side chamber and an opposite-side chamber. (For example, refer to PTL 1).

CITATION LIST

Patent Literature

[PTL 1] Japanese Patent Application Public Disclosure No. 2006-266268

SUMMARY OF INVENTION

Technical Problem

The reciprocating compressor discussed in PTL 1 includes a discharge port of the compressed air provided on a top dead center side of the cylinder portion, and therefore cannot reduce a piston top clearance to prevent the piston mechanism from interfering the discharge port. Therefore, this reciprocating compressor involves a problem of failing to improve a compression performance.

An object of the present invention to provide a reciprocating compressor configured to be able to improve the compression performance by reducing the piston top clearance.

Solution to Problem

According to one aspect of the present invention, a reciprocating compressor includes a cylinder including a cylindrical cylinder portion and a cylinder head portion provided on one side of the cylinder portion, and a piston mechanism reciprocably fittedly inserted on an inner peripheral side of the cylinder portion and including a piston defining an inside of the cylinder portion into a one-side chamber and an opposite-side chamber. A bottomed hole-shaped valve body housing portion is formed at the cylinder head portion. The valve body housing portion is opened to a piston side facing the piston in an axial direction of the cylinder portion. A valve body unit and a holding mechanism are provided in the valve body housing portion. The valve body unit is inserted in the valve body housing portion. The holding mechanism holds the valve body unit in the valve body housing portion, and includes a communication hole establishing communication between the valve body housing portion and the one-side chamber.

According to a preferable embodiment of the present invention, the reciprocating compressor can reduce the piston top clearance, thereby improving the compression performance.

DESCRIPTION OF EMBODIMENTS

In the following description, a reciprocating compressor according to an embodiment of the present invention will be described in detail with reference to FIGS. 1 to 5, citing a swing-type reciprocating air compressor as an example thereof.

Figure 1:
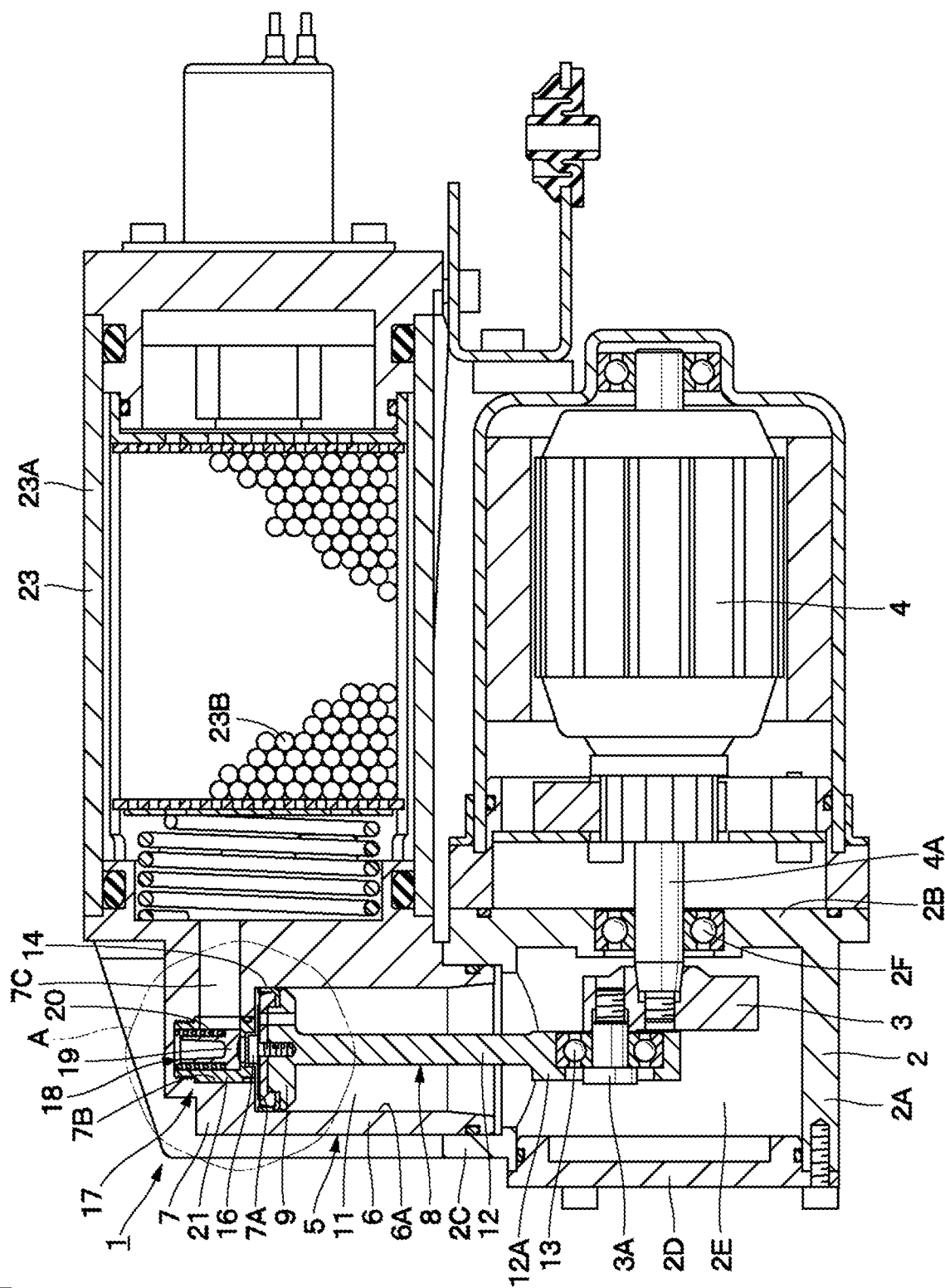
FIG. 1 is a vertical cross-sectional view illustrating a reciprocating air compressor according to an embodiment of the present invention.

In FIG. 1, a swing-type reciprocating air compressor 1 includes a crank case 2, a crankshaft 3, a cylinder 5, a piston mechanism 8, an intake valve 15, a discharge valve unit 18, and a valve holding member 21, which will be described below.

The crank case 2 is formed as a hollow container made from, for example, an alloy material containing aluminum. The crank case 2 includes a cylindrical portion 2A, a bearing mounting portion 2B, a cylinder mounting portion 2C, and a cover member 2D. The cylindrical portion 2A is opened on a front side in a direction of an axis of a rotational shaft 4A of an electric motor 4, which will be described below. The bearing mounting portion 2B is provided by reducing a diameter of a rear side of the cylindrical portion 2A. The cylinder mounting portion 2C is provided so as to be opened on a radial direction of the cylindrical portion 2A. The cover member 2D is provided so as to close the opening of the front side of the cylindrical portion 2A. An inside of the crank case 2 is defined as a crank chamber 2E for rotatably housing the crankshaft 3. A bearing 2F for rotatably supporting the rotational shaft 4A of the electric motor 4 is mounted on an inner peripheral side of the bearing mounting portion 2B. Further, a cylinder portion 6 of the cylinder 5, which will be described below, is mounted on the cylinder mounting portion 2C. Further, an intake port (not illustrated) for introducing external air (the atmosphere) is provided to the crank case 2.

The crankshaft 3 is coupled integrally rotatably to a distal end of the rotational shaft 4A of the electric motor 4 supported by the bearing 2F in the bearing mounting portion 2B. This crank shaft 3 forms a driving device together with the electric motor 4. A support bolt 3A is provided on the crankshaft 3 at a position eccentric from a center of a rotation of the rotational shaft 4A. Due to this configuration, the crankshaft 3 causes a circulating operation of the support bolt 3A and thus a reciprocating movement of the piston mechanism 8, which will be described below, by being rotationally driven by the electric motor 4.

The cylinder 5 is located on an outer peripheral side of the crank case 2 and provided so as to extend radially from the cylindrical portion 2A. The cylinder 5 is cylindrically formed with use of, for example, an alloy material containing aluminum. More specifically, the cylinder 5 includes the cylindrical cylinder portion 6, and a cylinder head portion 7 integrally formed at a distal end side, which is defined to be one side of the cylinder portion 6.

The cylinder portion 6 is made of a cylindrical member extending in the radial direction of the cylindrical portion 2A, and is attached by being fittedly inserted in the cylinder mounting portion 2C of the crank case 2 on a proximal end side (an opposite side) thereof corresponding to the cylindrical portion 2A side. A piston 9 of the piston mechanism 8, which will be described below, is reciprocably fittedly inserted inside the cylinder portion 6. An inner peripheral surface 6A of the cylinder portion 6 forms a sliding contact surface which a piston ring 14 of the piston mechanism 8 is in sliding contact with. Then, the cylinder head portion 7 is integrally provided on the distal end side of the cylinder portion 6. In the present embodiment, the cylinder 5 has been described referring to the example in which the cylinder portion 6 and the cylinder head portion 7 are provided integrally with each other, but the cylinder portion 6 and the cylinder head portion 7 may be formed as separate members. However, in the case where they are provided as separate members, a seal member should be added to prevent compressed air in the cylinder from leaking outward. Therefore, it is further desirable that they are formed integrally with each other.

Now, no discharge port of the compressed air is provided on the inner peripheral surface 6A of the cylinder portion 6 on the distal end side corresponding to the cylinder head portion 7 side, unlike the above-described patent literature, PTL 1. Therefore, the inner peripheral surface 6A is shaped like a smooth surface stepless throughout an entire surface in sliding contact with the piston 9 as far as a position reaching a bottom surface 7A of the cylinder head portion 7. This configuration prevents the piston ring 14 from being worn due to a step of the discharge port even when the piston 9 moves closer to the bottom surface 7A of the cylinder head portion 7. Therefore, this configuration allows a top dead center position of the piston 9 to be set to a position closer to the bottom surface 7A of the cylinder head portion 7.

The cylinder head portion 7 is integrally provided at the distal end side of the cylinder portion 6 so as to close the distal end side of the cylinder portion 6. For example, the cylinder head portion 7 and the cylinder portion 6 are integrally formed by performing cutting processing or the like on a single parent material (a metal block). Due to this configuration, the cylinder 5 can prevent the air from leaking from between the cylinder portion 6 and the cylinder head portion 7.

The cylinder head portion 7 includes the circular bottom surface 7A located at a deepest portion of a compression chamber 10, which will be described below, and facing the piston 9. A bottomed hole-shaped valve body housing portion 7B is formed at a central position of this bottom surface 7A. The valve body housing portion 7B is opened to a piston side facing the piston 9 in an axial direction of the cylinder portion 6. Further, a supply passage 7C is provided to the cylinder head portion 7 so as to extend radially from the valve body housing portion 7B. This supply passage 7C is configured to allow the compressed air discharged from the compression chamber 10 to flow toward an air drier 23, which will be described below.

The valve body housing portion 7B of the cylinder head portion 7 is configured to house a discharge valve assembly 17, which will be described below. More specifically, the discharge valve unit 18 and the valve holding member 21 are provided in the valve body housing portion 7B. The discharge valve unit 18 is inserted in the valve body housing portion 7B. The valve holding member 21 holds the discharge valve unit 18 in the valve body housing portion 7B. The valve body housing portion 7B is formed by a cylindrical surface 7B1, a bottom surface portion 7B2, and a female screw portion 7B3. The cylindrical surface 7B1 extends coaxially with the inner peripheral surface 6A of the cylinder portion 6. The bottom surface portion 7B2 closes a deep portion of this cylindrical surface 7B1. The female screw portion 7B3 is formed by reducing a diameter of the deep portion side the cylindrical portion 7B1.

The piston mechanism 8 is configured to discharge the compressed air in the compression chamber 10 toward the air drier 23 side by reciprocating in the cylinder portion 6 of the cylinder 5. The piston mechanism 8 includes the piston 9, a piston rod 12, the piston ring 14, the intake valve 15, and a fixation bolt 16, which will be described below.

The piston 9 is reciprocably fittedly inserted on the inner peripheral side of the cylinder portion 6 of the cylinder 5. Due to this configuration, the piston 9 defines the inside of the cylinder portion 6 into the compression chamber 10 and a non-compression chamber 11. The compression chamber 10 is defined as a one-side chamber located on the cylinder head portion 7 side. The non-compression chamber 11 is defined as an opposite-side chamber located on the crank case 2 side.

The piston 9 is formed by stacking a main body portion 9A and a ring holder 9B. The main body portion 9A is made of a disk-like member having a slightly smaller diameter dimension than an inner diameter dimension of the cylinder portion 6. A screw hole 9C is formed at a central position of the piston 9. The screw hole 9C extends axially so as to penetrate through across the main body portion 9A and the ring holder 9B. Further, an arc-shaped communication passage 9D (refer to FIG. 3) is provided to the piston 9 at a radially intermediate position. This communication passage 9D establishes communication between the compression chamber 10 and the non-compression chamber 11 by penetrating through the main body portion 9A and the ring holder 9B. The piston ring 14 is provided on an outer peripheral side of the main body portion 9A of the piston 9 in an externally fitted state, and the piston ring 14 is fixed to an outer peripheral side of the piston 9 by the ring holder 9B. A distal end surface (a top surface) of the ring holder 9B is configured as a flat valve body abutment surface 9B1. The valve body abutment surface 9B1 is used to place the intake valve 15 thereon, which will be described below.

As illustrated in FIG. 1, the piston rod 12 is provided integrally with the main body portion 9A of the piston 9, and is configured to connect the piston 9 to the crankshaft 3 forming the driving device. One end side of the piston rod 12 in a length direction thereof is integrally connected to a central position of the main body portion 9A, and an opposite end side thereof extending toward the crank case 2 side in the cylinder portion 6 is connected to the crankshaft 3. The opposite end side of the piston rod 12 is configured as a cylindrical bearing support portion 12A, and this bearing support portion 12A is rotatably attached to a support bolt 3A of the crankshaft 3 via a bearing 13. Due to this configuration, the piston rod 12 can cause the piston 9 to reciprocate while swinging in the cylinder portion 6 by allowing the bearing support portion 12A to swivel according to the rotational driving of the crankshaft 3 by the electric motor 4.

Now, the compression chamber 10 defined in the cylinder portion 6 is formed at a position between the cylinder head portion 7 and the piston 9 of the piston mechanism 8. In other words, the compression chamber 10 is surrounded by the cylinder portion 6, the cylinder head portion 7, the piston 9, and the valve holding member 21, and a volume thereof is minimized when the piston 9 reaches the top dead center illustrated in FIG. 2. The volume of the compression chamber 10 in this state corresponds to a piston stop clearance.

The piston ring 14 is provided around the piston 9, and is configured in such a manner that an outer peripheral side thereof is in sliding contact with the inner peripheral surface 6A of the cylinder portion 6. This piston ring 14 is configured to seal between the piston 9 and the cylinder portion 6. The piston ring 14 is formed as, for example, a seal member L-shaped in cross section that is made from a resin material having an anti-wear property and a self-lubricating property. An inner diameter side of the piston ring 14 is fixed by being sandwiched between the main body portion 9A and the ring holder 9B.

Figure 3:
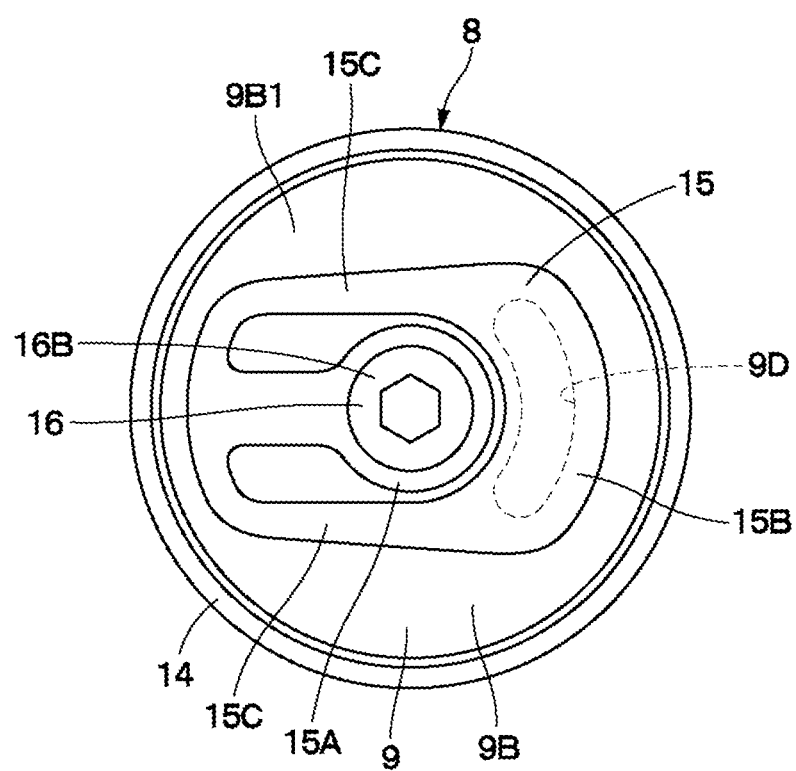
FIG. 3 is a plan view illustrating a piston of a piston mechanism, a fixation bolt, and an intake valve as viewed from a cylinder head side.

The intake valve 15 is provided on the communication passage 9D of the piston 9, which establishes the communication between the compression chamber 10 and the non-compression chamber 11. The intake valve 15 is configured to open the communication passage 9D during an intake stroke and close the communication passage 9D during a compression stroke. As illustrated in FIG. 3, the intake valve 15 is made of an elastic (spring-like) elongated circular thin plate, and includes a mounting portion 15A, a valve portion 15B, and a pair of valve spring portions 15C. The mounting portion 15A is located at the central portion of the piston 9. The valve portion 15B is located around the mounting portion 15A and closes the communication passage 9D. The pair of valve spring portions 15C connects the mounting portion 15A and the valve portion 15B to each other on an opposite side of the mounting portion 15A from the valve portion 15B.

The intake valve 15 is in abutment with a valve body abutment surface 9B1 of the ring holder 9B while the mounting portion 15A is in alignment with the screw hole 9C of the piston 9. In this state, the intake valve 15 is fixed by the fixation bolt 16, which will be described below.

Figure 2:
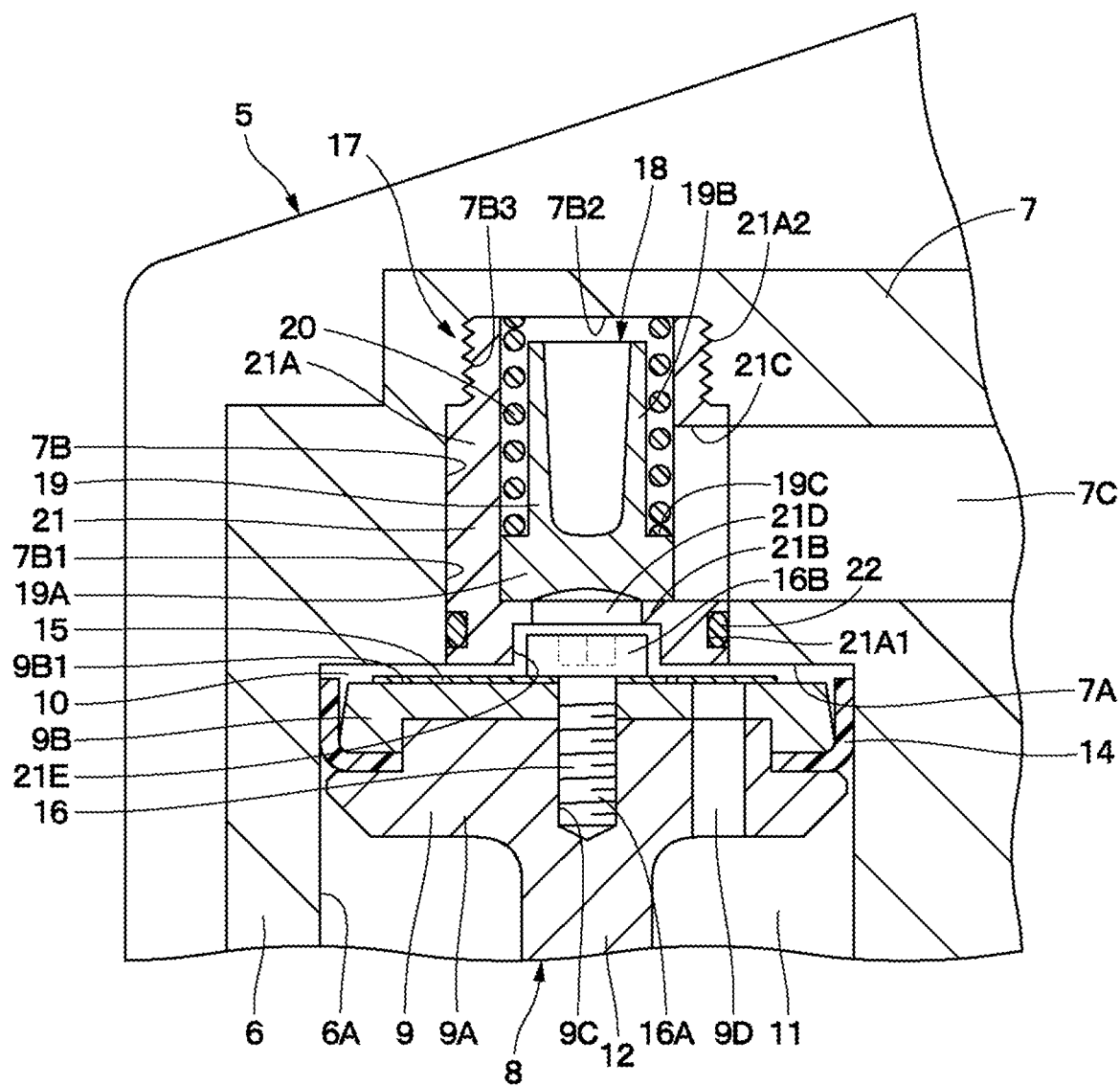
FIG. 2 is a vertical cross-sectional view illustrating a vicinity of an A portion illustrated in FIG. 1 in an enlarged manner.

The fixation bolt 16 forms a fixation member fixing the intake valve 15 to the piston 9. This fixation bolt 16 is formed as, for example, a bolt equipped with a hexagonal hole that includes a screw portion 16A and a head portion 16B having the hexagonal hole. On the fixation bolt 16, while the screw portion 16A is inserted through the mounting portion 15A, this screw portion 16A is threadably engaged with the screw hole 9C. Due to this configuration, the fixation bolt 16 can fix the intake valve 15 to the main body portion 9A side together with the ring holder 9B. Now, as illustrated in FIG. 2, the fixation bolt 16 as the fixation member is provided in such a manner that the head portion 16B, which is a part of the fixation bolt 16, protrudes from the piston 9 toward the cylinder head portion 7 side when the intake valve 15 is fixed to the piston 9. In this case, because a bolt housing portion 21E housing the head portion 16B is formed on the valve holding member 21, which will be described below, with the holding member 21 facing the head portion 16B that has become a protruding portion, this configuration allows the piston 9 to move closer to the bottom surface 7A of the cylinder head portion 7, thereby reducing the piston stop clearance.

The present invention is characterized by the discharge valve assembly 17 including the discharge valve unit 18 and the valve holding member 21, and a configuration thereof will be described next.

Figure 4:
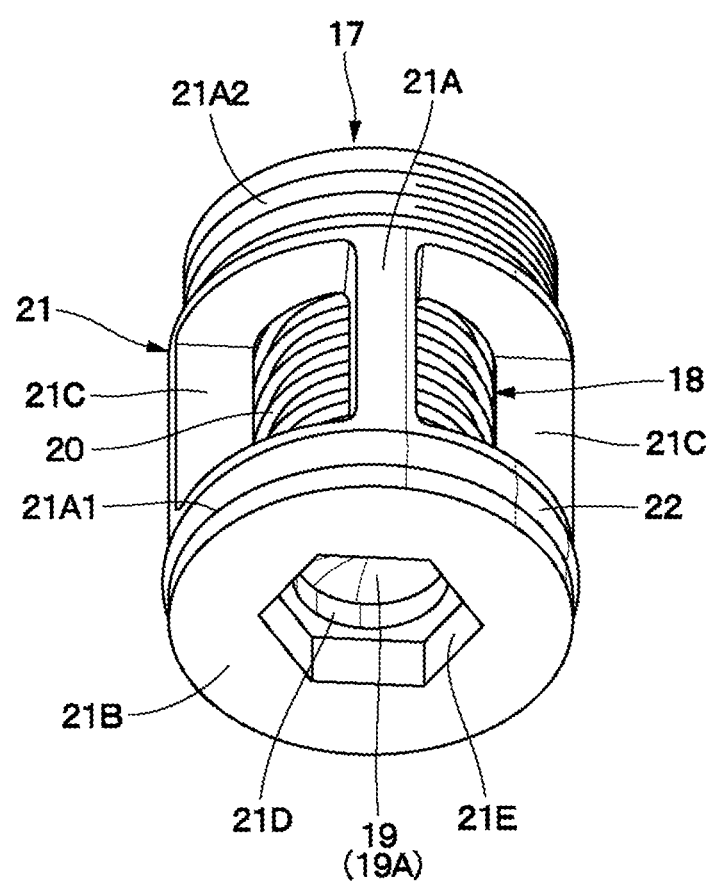
FIG. 4 is a perspective view illustrating a discharge valve assembly alone in an enlarged manner.
Figure 5:
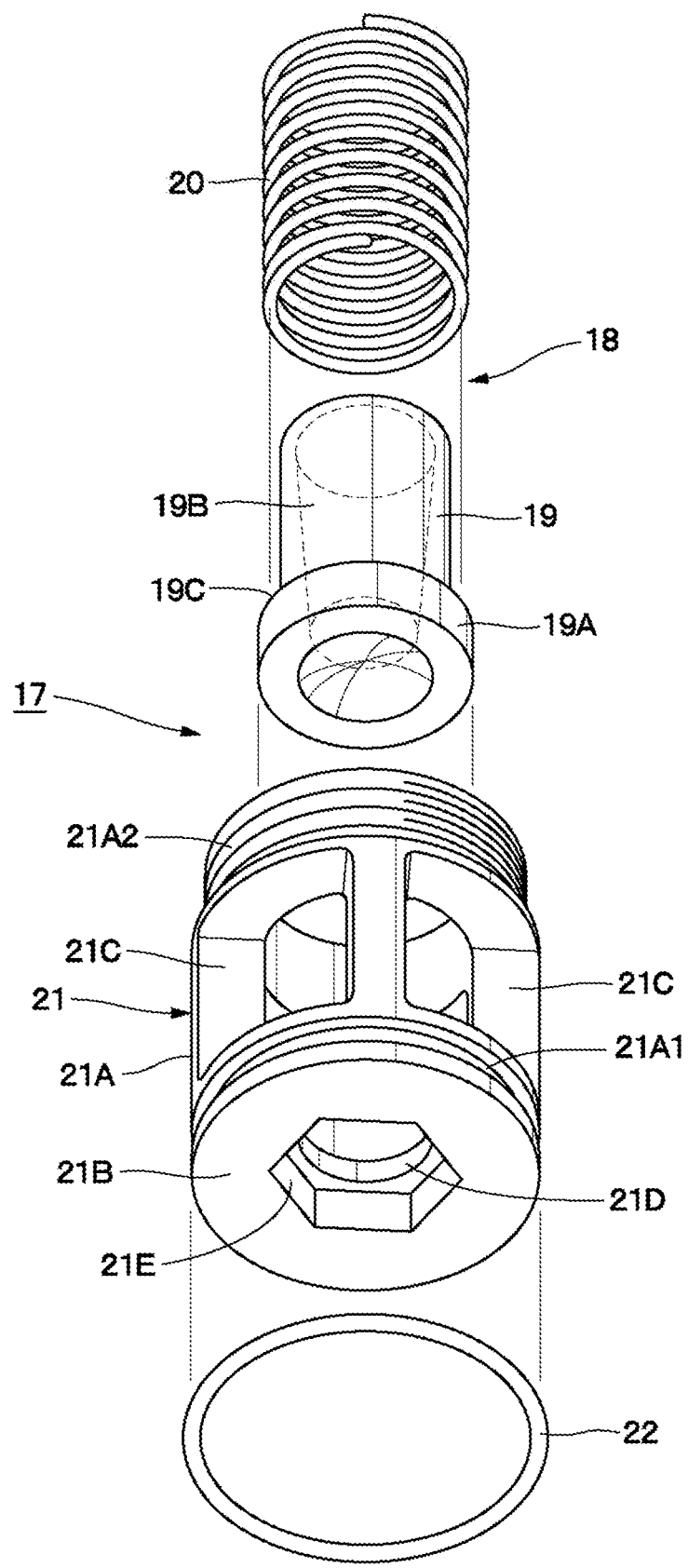
FIG. 5 is an exploded perspective view illustrating the discharge valve assembly in an exploded state.

As illustrated in FIGS. 4 and 5, the discharge valve assembly 17 is provided in the valve body housing portion 7B of the cylinder head portion 7. The discharge valve assembly 17 can be mounted into the valve body housing portion 7B from the cylinder portion 6 side. The discharge valve assembly 17 includes the discharge valve unit 18, which will be described below, and the valve holding member 21. Now, a setting of the discharge valve assembly 17, such as an discharge performance, can be easily changed by preparing a plurality of types having different dimensions and settings of each of the portions (for example, a diameter dimension of a passage and a spring force) from one another, and thus selecting and mounting one of this plurality of types.

The discharge valve unit 18, which constitutes a part of the discharge valve assembly 17, is configured to form a valve unit inserted in the valve body housing portion 7B of the cylinder head portion 7. Then, the discharge valve unit 18 is formed as a discharge valve by including a valve body 19 and the spring member 20.

The valve body 19 is configured to be opened when the compressed air is discharged from the compression chamber 10 via a communication hole 21D of the valve holding member 21. The valve body 19 includes a disk-like valve portion 19A and a cylindrical portion 19B. The valve portion 19A is seated onto and separated from a bottom portion 21B serving as a valve seat of the valve holding member 21. The cylindrical portion 19B is formed to have a smaller diameter than the valve portion 19A, and extends axially from the valve portion 19A. The valve body 19 is shaped in such a manner that the cylindrical portion 19B is formed to have the smaller diameter than the valve portion 19A, by which a stepped portion 19C is formed between this valve portion 19A and the cylindrical portion 19B. The valve body 19 is held by the valve holding member 21 movably in the axial direction of the cylinder portion 6.

The spring member 20 is formed as a biasing device that biases the valve body 19 toward the bottom portion 21B of the valve holding member 21. The spring member 20 is formed as, for example, a compression coil spring having a dimension larger than the outer dimension of the cylindrical portion 19B of the valve body 19 and smaller than an inner diameter dimension of the cylindrical portion 21A of the valve holding member 21. The spring member 20 is arranged between the stepped portion 19C of the valve body 19 and the bottom surface portion 7B2 of the valve body housing portion 7B.

The valve holding member 21 is configured to form a holding mechanism, and hold the valve body 19 and the spring member 20 of the discharge valve unit 18 in the valve body housing portion 7B. The valve holding member 21 is formed into a bottomed cylindrical shape by including the cylindrical portion 21A inserted in the valve body housing portion 7B and the bottom portion 21B closing the piston 9 side of the cylindrical portion 21A. An annular groove 21A1 is formed on an outer peripheral side of the cylindrical portion 21A at a position on the bottom portion 21B side. An O-ring 22 is attached in this annular groove 21A1. The O-ring 22 functions to air-tightly seal between the cylindrical portion 21A and the cylindrical surface 7B1 of the valve body housing portion 7B. On the other hand, a male screw portion 21A2 is formed on an opening side of the cylindrical portion 21A, which corresponds to an axially opposite side from the annular groove 21A1. The male screw portion 21A2 is threadably engaged with the female screw portion 7B3 of the valve body housing portion 7B.

A plurality of communication openings 21C is formed at the cylindrical portion 21A of the valve holding member 21 by radially penetrating through intermediate positions between the annular groove 21A1 and the male screw portion 21A2. Each of the communication openings 21C is configured to establish communication between the compression chamber 10 and the supply passage 7C of the cylinder head portion 7 in cooperation with the communication hole 21D, which will be described below, when the valve body 19 is opened.

The bottom portion 21B of the valve holding member 21 forms the valve seat onto which the valve body 19 is seated when the valve is closed. Further, the communication hole 21D is provided at a center of the bottom portion 21B. The communication hole 21D forms the discharge port by axially penetrating through the bottom portion 21B. The communication hole 21D is configured to establish communication between the valve body housing portion 7B and the compression chamber 10. Now, an axial dimension of the bottom portion 21B is set in such a manner that a lower surface thereof is located on the same plane as the bottom surface 7A of the cylinder head portion 7.

Further, the bottom portion 21B includes the bolt housing portion 21E as a fixation member housing portion by flaring on the compression chamber 10 side of the compression hole 21D. This bolt housing portion 21E is configured to house the columnar head portion 162 axially protruding when the fixation bolt 16 is attached to the piston 9. In this case, as illustrated in FIGS. 4 and 5, the bolt housing portion 21E is formed as a hexagonal bottomed hole. Due to this configuration, the valve holding member 21 can be easily threadably engaged with the valve body housing portion 7B by engaging a hexagonal fastening tool (for example, a socket wrench) with the bolt housing portion 21E. The bolt housing portion 21E is set to a slightly larger dimension than the head portion 16B to reduce the above-described piston top clearance.

Now, one example of a procedure for assembling the discharge valve assembly 17 and a procedure for mounting the discharge valve assembly 17 into the cylinder head portion 7 will be described.

When the discharge valve assembly 17 is assembled, the O-ring 22 is attached into the annular groove 21A1 of the valve holding member 21. The discharge valve assembly 17 can be assembled by inserting the valve body 19 and the spring member 20 into the cylindrical portion 21A from the opening side of the valve holding member 21 in this state.

After the discharge valve assembly 17 is assembled, this discharge valve assembly 17 is mounted into the cylinder head portion 7. In this case, the discharge valve assembly 17 is introduced from the opening side of the cylinder portion 6, and the valve holding member 21 is inserted into the valve body housing portion 7B of the cylinder head portion 7. In this state, the fastening tool engaged with the bolt housing portion 21E of the valve holding member 21 is rotated in a tightening direction. As a result, the male screw portion 21A2 of the cylindrical portion 21A is threadably engaged with the female screw portion 7B3 of the valve body housing portion 7B, and therefore the discharge valve assembly 17 can be mounted in the valve body housing portion 7B of the cylinder head portion 7.

As illustrated in FIG. 1, the air drier 23 is mounted on the cylinder 5. The air dryer 23 includes a dryer case 23A and a moisture absorbent 23B. The dryer case 23A is made of a sealingly closed container. The water absorbent 23B is realized by a desiccant such as silica gel housed in the dryer case 23A. The dryer case 23A is formed with use of a part of the cylinder 5, and an inside thereof is in communication with the supply passage 7C. Then, the air dryer 23 is configured to supply and discharge the compressed air in a dried state (dried air) when the compressed air is supplied from the reciprocating air compressor 1 to a plurality of air suspensions (any of them is not illustrated).

The reciprocating air compression 1 according to the present embodiment is configured in the above-described manner, and an operation thereof will be described next.

First, when the rotational shaft 4A of the electric motor 4 is rotationally driven, the crankshaft 3 is rotated together with this rotational shaft 4A. As a result, the piston 9 connected to the crankshaft 3 reciprocates while swinging in the cylinder portion 6, and alternately repeats the intake stroke in which the piston 9 moves away from the cylinder head portion 7 and the discharge stroke in which the piston 9 moves toward the cylinder head portion 7. In this intake stroke, the external air is introduced into the non-compression chamber 11 from the intake port of the crank case 2. In the discharge stroke, while the air in the compression chamber 10 is compressed by the piston 9, the compressed air is discharged by opening the valve body 19 of the discharge valve unit 18. This discharged compressed air is supplied to each of the air suspensions as the sufficiently dried dried air by passing through inside the air dryer 23.

In this manner, according to the present embodiment, the bottomed hole-shaped valve body housing portion 7B, which is opened at the position facing the piston 9 in the axial direction of the cylinder portion 6, is formed at the cylinder head portion 7. While being configured in this manner, the discharge valve unit 18, which is inserted in the valve body housing portion 7B, and the valve holding member 21, which holds the discharge valve unit 18 in the valve body housing portion 7B and includes the communication hole 21D establishing the communication between the valve body housing portion 7B and the compression chamber 10, are provided in the valve body housing portion 7B.

Therefore, since the discharge port of the compressed air, i.e., the communication hole 21D of the valve holding member 21 is provided on the bottom surface 7A side of the cylinder head portion 7, the inner peripheral surface 6A of the cylinder portion 6 can be formed as the smooth surface stepless throughout the entire surface in sliding contact with the piston 9 as far as the position reaching the bottom surface 7A of the cylinder head portion 7. This configuration allows the top dead center position of the piston 9 to be set to a position closer to the bottom surface 7A of the cylinder head portion 7. As a result, the reciprocating air compressor 1 can reduce the piston top clearance, thereby improving the compression performance thereof.

For example, a plurality of types having, for example, different spring forces of the spring member 20 and different diameter dimensions of the communication hole 21D from one another is prepared as the discharge valve unit 18 and the valve holding member 21. Due to this preparation, the setting such as the discharge performance can be easily changed by selecting and mounting one of the plurality of types when mounting the discharge valve unit 18 and the valve holding member 21 into the valve body housing portion 7B.

The discharge valve unit 18 includes the valve body 19 and the spring member 20, which biases the valve body 19 toward the valve holding member 21. Due to this configuration, the discharge valve unit 18 can bias the valve body 19 toward the valve holding member 21 by the spring member 20.

Further, the valve body 19 can be used as a discharge valve opened when compressed fluid is discharged from the compression chamber 10 via the communication hole 21D.

The piston mechanism 8 includes the piston 9, the piston rod 12 provided integrally with the piston 9 and connected to the crankshaft 3, the piston ring 14 provided around the piston 9 and disposed in sliding contact with the cylinder portion 6, the intake valve 15 provided on the communication passage 9D establishing the communication between the non-compression chamber 11 and the compression chamber 10, and the fixation bolt 16 fixing the intake valve 15 to the piston 9 and including the head portion 16B protruding from the piston 9 toward the cylinder head portion 7 side. While the piston mechanism 8 is configured in this manner, the bolt housing portion 21E, which houses the head portion 16B of the fixation bolt 16, is formed on the valve holding member 21.

Therefore, the bolt housing portion 21E can reduce the piston top clearance while avoiding the head portion 16B of the fixation bolt 16. As a result, the reciprocating air compressor 1 can improve the compression performance thereof.

Further, the cylinder 5 includes the cylinder portion 6 and the cylinder head portion 7 formed integrally with each other. In addition, the discharge valve assembly 17 is configured to be mounted by being introduced from inside the cylinder portion 6. Therefore, there is no portion where an air leak might occur at all between the compression chamber 10 and the air drier 23. Due to this configuration, the compressed air can be entirely supplied from the compression chamber 10 to the air drier 23.

In the embodiment, the valve body unit has been described based on the example in which it is applied to the discharge valve unit 18 opened when the compressed fluid is discharged from the compression chamber 10 via the communication hole 21D. However, the present invention is not limited thereto, and, for example, the valve body unit may be configured in such a manner that the valve body unit is applied to an intake valve unit opened when the air is introduced from outside, and this intake valve unit is housed in the valve body housing portion of the cylinder head portion.

In the embodiment, the valve holding member has been described based on the example in which the valve holding member 21 serving as the holding mechanism is formed into the bottomed cylindrical shape by including the cylindrical portion 21A and the bottom portion 21B. However, the present invention is not limited thereto, and, for example, the valve holding member may be configured in such a manner that the valve body 19 and the spring member 20 are movably housed in the valve body housing portion 7B of the cylinder head portion 7, and only the opening side of the valve body housing portion 7B is closed (held) by a holding mechanism formed into a disk-like shape.

In the embodiment, the piston has been described based on the example in which it is embodied by the swing-type piston mechanism 8 including the piston 9 and the piston rod 12 integrated with each other. However, the present invention is not limited thereto, and the above-described configuration may be applied to, for example, a reciprocating compressor configured in such a manner that the piston rod is rotatably connected to the piston with use of a pin.

In the embodiment, the reciprocating compressor has been described based on the example in which it is embodied by the reciprocating air compression 1 mounted on the vehicle, but may be applied to a reciprocating compressor other than the reciprocating air compressor 1 designed to be mounted on the vehicle, such as a reciprocating compressor for use in a factory or a construction site.

Further, in the embodiment, the reciprocating compressor has been described based on the example in which it is embodied by the reciprocating air compressor 1 of single-stage compression that includes the single cylinder 5, the single piston 8, and the like. However, the present invention is not limited thereto, and, for example, the reciprocating compressor may be configured to be applied to a reciprocating air compressor of two-stage compression that includes two cylinders, two pistons, and the like, or a reciprocating air compressor that includes three or more cylinders, three or more pistons, and the like.

Possible configurations as the reciprocating compressor according to the above-described embodiment include the following examples.

According to a first configuration of the reciprocating compressor, the reciprocating compressor includes a cylinder including a cylindrical cylinder portion and a cylinder head portion provided on one side of the cylinder portion, and a piston mechanism reciprocably fittedly inserted on an inner peripheral side of the cylinder portion and including a piston defining an inside of the cylinder portion into a one-side chamber and an opposite-side chamber. A bottomed hole-shaped valve body housing portion is formed at the cylinder head portion. The valve body housing portion is opened to a piston side facing the piston in an axial direction of the cylinder portion. A valve body unit and a holding mechanism are provided in the valve body housing portion. The valve body unit is inserted in the valve body housing portion. The holding mechanism holds the valve body unit in the valve body housing portion, and includes a communication hole establishing communication between the valve body housing portion and the one-side chamber.

According to a second configuration, in the first configuration, the valve body unit includes a valve body and a biasing unit configured to bias the valve body toward the holding mechanism.

According to a third configuration, in the second configuration, the valve body is a discharge valve opened when compressed fluid is discharged from the one-side chamber via the communication hole.

According to a fourth configuration, in any of the first to third configurations, the piston mechanism includes the piston, a piston rod provided integrally with the piston and connected to a driving device, a piston ring provided around the piston and disposed in sliding contact with the cylinder portion, an intake valve provided on a communication passage establishing communication between the opposite-side chamber and the one-side chamber, and a fixation member fixing the intake valve to the piston and partially protruding from the piston toward the cylinder head portion side. A fixation member housing portion is formed at the holding mechanism. The fixation member housing portion houses the protruding portion of the fixation member.

According to a fifth configuration, in any of the first to fourth configurations, the cylinder portion and the cylinder head portion are formed integrally with each other.

The present invention is not limited to the above-described embodiments, and includes various modifications. For example, the above-described embodiments have been described in detail to facilitate better understanding of the present invention, and the present invention is not necessarily limited to the configuration including all of the described features. Further, a part of the configuration of some embodiment can be replaced with the configuration of another embodiment, and some embodiment can also be implemented with a configuration of another embodiment added to the configuration of this embodiment. Further, each embodiment can also be implemented with another configuration added, deleted, or replaced with respect to a part of the configuration of this embodiment.

The present application claims priority under the Paris Convention to Japanese Patent Application No. 2017-012301 filed on Jan. 26, 2017. The entire disclosure of Japanese Patent Application No. 2017-012301 filed on Jan. 26, 2017 including the specification, the claims, the drawings, and the abstract is incorporated herein by reference in its entirety.

REFERENCE SIGN LIST 1 reciprocating air compressor (reciprocating compressor)
2 crank case
3 crankshaft (driving device)
4 electric motor (driving device)
5 cylinder
6 cylinder portion
7 cylinder head portion
8 piston mechanism
9 piston
9D communication passage
10 compression chamber (one-side chamber)
11 non-compression chamber (opposite-side chamber)
12 piston rod
14 piston ring
15 intake valve
16 fixation bolt (fixation member)
16B head portion (protruding portion)
17 discharge valve assembly
18 discharge valve unit (valve body unit)
19 valve body
20 spring member (biasing device)
21 valve holding member (holding mechanism)
21D communication hole
21E bolt housing portion (fixation member housing portion)

The invention claimed is:

1. A reciprocating compressor, comprising:
a cylinder including a cylinder portion and a cylinder head portion on one side of the cylinder portion; and
a piston mechanism reciprocably fitted on an inner peripheral side of the cylinder portion, the piston mechanism including a piston defining an inside of the cylinder portion into a first side chamber and a second side chamber,
wherein a bottomed hole-shaped valve body housing portion is defined at the cylinder head portion, the bottomed hole-shaped valve body housing portion including an opening that is open to a piston side facing the piston in an axial direction of the cylinder portion,
wherein the bottomed hole-shaped valve body housing portion houses a discharge valve assembly,
wherein the discharge valve assembly is inserted into the bottomed hole-shaped valve body housing portion through the opening of the bottomed hole-shaped valve body housing portion,
wherein the discharge valve assembly includes a valve body unit and a holding mechanism,
wherein the holding mechanism is configured to hold the valve body unit in the bottomed hole-shaped valve body housing portion and includes a communication hole configured to establish communication between the bottomed hole-shaped valve body housing portion and the first side chamber,
wherein the piston mechanism includes:
the piston;
a piston rod which is integral with the piston and connected to a driving device;
a piston ring around the piston, the piston ring being configured to be in sliding contact with the cylinder portion;
an intake valve on a communication passage configured to establish communication between the second chamber and the first chamber; and
a fixation member fixing the intake valve to the piston and partially protruding from the piston toward a cylinder head portion side,
wherein the holding mechanism includes a screw portion that fixes the holding mechanism to the cylinder head portion, and a fixation member housing portion that is defined as a polygonal bottomed hole that houses a protruding portion of the fixation member when the piston reaches a top dead center position,
wherein the communication hole extends through the polygonal bottomed hole,
wherein the valve body unit includes a valve body and a spring member, and the spring member is in abutment with a bottom surface portion of the bottomed hole-shaped valve body housing portion, and
wherein the protruding portion of the fixation member faces the communication hole, and a diameter of the protruding portion of the fixation member is larger than a diameter of the communication hole.

2. The reciprocating compressor according to claim 1, wherein the spring member is configured to bias the valve body toward the holding mechanism.

3. The reciprocating compressor according to claim 2, wherein:
the valve body is a discharge valve;
the discharge valve is seated on the communication hole when the discharge valve is closed; and
the discharge valve discharges compressed fluid from the first side chamber via the communication hole when the discharge valve opens.

4. The reciprocating compressor according to claim 1, wherein the cylinder portion and the cylinder head portion are integral with each other.

5. The reciprocating compressor according to claim 1, wherein:
a bottom portion of the holding mechanism defines a valve seat onto which the valve body is seated when the valve body is closed;
the communication hole is at a center of the bottom portion of the holding mechanism;
the communication hole defines a discharge port by axially penetrating through the bottom portion of the holding mechanism; and the first side chamber is a compression chamber on the cylinder head portion side in the inside of the cylinder portion.

6. The reciprocating compressor according to claim 5, wherein the valve body has a recessed portion that faces the protruding portion of the fixation member through the communication hole.

\* \* \* \* \*